United States Patent Office 3,515,514
Patented June 2, 1970

3,515,514
PRODUCTION OF HYDROGEN CONTAINING GASES
Peter Desmond Holmes, 9 Greenwich Cove Drive, Old Greenwich, Conn. 06870, and Alan Richard Thornhill, 131 Manor Green Road, Epsom, Surrey, England
No Drawing. Continuation-in-part of application Ser. No. 360,747, Apr. 17, 1964. This application May 25, 1967, Ser. No. 641,153
Claims priority, application Great Britain, Apr. 23, 1963, 15,935/63
Int. Cl. C01b 1/02
U.S. Cl. 23—212
13 Claims

ABSTRACT OF THE DISCLOSURE

Commercial methanol is cracked to give hydrogen by passing it first over a supported nickel catalyst to destroy impurities and then over a zinc oxide, copper oxide catalyst which may also comprise chromium oxide to complete the cracking.

---

The present application is a continuation-in-part of U.S. Ser. No. 360,747, now abandoned.

This invention relates to a process for the production of free hydrogen-containing gases.

It has been disclosed that methanol can be cracked to a mixture of hydrogen and carbon monoxide. It has also been disclosed that methanol can be reacted with water to yield a mixture of hydrogen and carbon dioxide and that the reaction can be carried out by vapourising methanol and steam over a fixed catalyst at a space velocity of 200–5000 vol./vol./hr., a suitable catalyst being obtained by the coprecipitation of copper and zinc oxides, or chromates, fused copper and zinc oxide with or without chromium oxide. It has also been stated that the methanol used must be of high purity since appreciable amounts of impurities such as ethanol or higher molecular weight alcohols lead to a rapid poisoning of the catalyst with consequential decline in activity. It has been stated that this poisoning effect is quickly apparent even with concentration of impurities as low as 0.05%.

We believe that other impurities such as certain aldehydes also lead to poisoning of the catalyst.

In practice it is difficult or very expensive to produce methanol of a purity such that rapid poisoning of the catalyst does not take place.

According to one aspect of the present invention there is provided a process for the production of a hydrogen-containing gas which comprises passing a mixture of methanol and water, at elevated temperature and in vapour phase, over a supported nickel catalyst, for the decomposition of at least part of the impurities contained in the methanol and whereby some of the methanol is also decomposed and thereafter passing the product at elevated temperature over a catalyst consisting essentially of zinc oxide and copper oxide, with or without chromium oxide, said oxides being in admixture or combination, whereby a substantial part of the remaining methanol is decomposed with production of a hydrogen-containing gas.

Preferably the nickel catalyst and the zinc/copper containing catalyst are contained in separate reactors in order that the reaction temperature in the two stages can be more readily controlled, if necessary using a heating stage between the two reactors.

Thus it is to be noted that the nickel catalyst causes some cracking of methanol to hydrogen and carbon monoxide. When the two stages are operated under the same reaction conditions, part of the carbon monoxide will be converted in the presence of the zinc/copper containing catalyst to carbon dioxide. If desired, the feed stock methanol may be washed with alkali before being passed over the nickel catalyst. In general this treatment will reduce the carbon monoxide content of the product gases. When it is desired to avoid the presence of carbon monoxide in the product or when it is desired to use this carbon monoxide (by reaction with water) to increase the hydrogen yield, it may be necessary to operate over the zinc/copper containing catalyst at a higher temperature than employed over the nickel catalyst.

The pressure employed in the two stages may be the same or different and may be atmospheric, sub-atmospheric or super-atmospheric.

Preferably the temperature in the first stage will lie in the range 150 to 350° C. and in the second stage 150 to 400° C., most preferably 240° to 270° C.

The pressure employed may be atmospheric, sub-atmospheric or super-atmospheric.

The liquid space velocity of methanol in the single stage process or in the second stage of the two stage process will preferably lie in the range 0.5–1.0 vol./vol./hr.

Usually the mol ratio of water to methanol will lie in the range 1:1 to 4:1 and is preferably about 2:1.

The preparation of the nickel catalyst and its activation may be carried out in any convenient manner, the following three methods being merely illustrative.

(a) The catalyst may be prepared on the base by an impregnation technique by dissolving in water a nickel salt, for example nickel nitrate, and impregnating the support material with it. The support material may be conveniently in the form of granules or pellets of any desired size formed from ground support material. After impregnation, the catalyst is dried and is then in a form in which it can be stored for long periods without deterioration. In order to use the catalyst, it must be activated by heating to decompose the salt; in the case of the nitrate this requires a temperature of about 500–550° C., and the nickel will be converted to the oxide. Final activation by reduction to metallic nickel can be carried out in a stream of hydrogen or hydrogen containing gas at a temperature of 150° to 600° C. and at a pressure of 0–200 lbs./sq. in. gauge. The time of treatment depends upon the temperature. Typical conditions using a sepiolite catalyst support are 16 hours at 500° C. and atmospheric pressure; no damage results in the sepiolite however, if it is heated at a temperature above 600° C.

(b) The catalyst may be prepared by milling dry nickel formate with powdered catalyst support, and the mixture subsequently pelleted. The advantage of this method of preparation is that a salt such as nickel formate reduces directly to nickel (without going through the oxide state) in a non-oxidising atmosphere, for example in an inert gas or hydrogen stream at a temperature of 150° C. to 300° C. At 250° C. treatment for 4 hours will usually be appropriate. This method has the advantage that it is not necessary to heat large quantities of catalysts to temperatures of 500° C. and higher.

(c) The catalyst may be prepared by a technique which utilises the water soluble complex formed when nickel formate dissolves in ammonia. This complex breaks down on heating to give nickel formate again. By using this water-soluble complex, catalysts may be prepared by the impregnation technique from normally water insoluble compounds such as nickel formate. The compound is dissolved in ammonia solution and the solution used for the impregenation of granules or pellets of the support material; the catalyst is then dried, and activation is carried out by the method described under (b).

After the reduction, the nickel catalyst should not be allowed to come into contact with air or spontaneous oxidation of the nickel to nickel oxide may occur.

Preferably the activated catalyst contains 2 to 20% by wt. of elemental nickel, based on the total weight of catalyst.

Suitable catalysts for use in the process of the invention are nickel supported on alumina, kieselguhr, chalk and silica gel.

A preferred catalyst is nickel-on-sepiolite.

Sepiolite is a commercially available clay mineral, which occurs naturally and which can also be prepared synthetically. It has the ideal formula $$H_4Mg_9Si_{12}O_{30}(OH)_{10} \cdot 6H_2O$$

and is also known as Meerschaum. Further information on sepiolite and its properties may be found in "Chemistry and Industry" of Nov. 16, 1957, at pages 1492 to 1495.

Sepiolite possesses an advantage over some other bases, for example alumina, in that there is no reaction of the nickel salt with sepiolite during the heating of the catalyst to convert the nickel salt to oxide, and the final reduction can be carried out at a lower temperature than that necessary for nickel-alumina catalyst.

Preferably the zinc/copper or zinc/copper/chromium catalyst contains zinc and copper in an atomic ratio in the range 100:1 to 2:1.

Preferably when chromium is present the atomic ratio of zinc to chromium lies in the range 4:1 to 1:1.

Suitable zinc/copper containing catalysts, preferably also containing chromium, are described in U.S. Patent specification 2,425,625 and in a paper by Y. Ogino, M. Oba, and H. Uchida in the Bull. Chem. Soc., Japan, 33, 358–63 (1960).

According to another aspect of this invention there is provided a process for the production of a hydrogen-containing gas which comprises passing a mixture of methanol and water over a nickel catalyst and a zinc/copper catalyst, the catalysts being in separate beds in the same reactor or being used as a mixture, the reaction conditions being as hereinbefore described and periodically discontinuing the flow of feedstock and regenerating the catalyst system by passing a free oxygen-containing gas, preferably air, at elevated temperature preferably 150 to 450° C., through the reactor.

After regeneration of the catalyst system it may be necessary to pass a free hydrogen-containing gas, at elevated temperatures, over the catalyst system in order to re-activate the nickel catalyst, before restoring the flow of feedstock.

By the use of the process of the present invention commercial grade methanol may be employed for the production of a hydrogen-containing gas; the methanol may contain substantial amounts of impurities, for example 1.0% by weight or more of ethanol.

The product obtained will usually consist predominantly of a mixture of hydrogen and carbon dioxide; the carbon dioxide may be removed by a suitable scrubbing stage.

The process is particularly suitable for the production of hydrogen in a mobile unit and is suitable for the production of hydrogen of a purity suitable for use in fuel cells.

EXAMPLE 1

A nickel catalyst and a zinc/copper/chromium catalyst were prepared in the following manner:

A porous support consisting of sepiolite in the form of 4–8 mesh BSS granules was impregnated with a solution of nickel formate in aqueous ammonia so that the catalyst after activation contained 10% weight of nickel. After drying the catalyst was broken down into granules of 12–18 mesh BSS.

The nickel catalyst was activated by treatment with hydrogen for 4 hours at 250° C. and atmospheric pressure using a gaseous space velocity of 100 vol./vol./hour.

A copper/zinc/chromium catalyst was prepared as follows.

39.2 gms. of $CuSO_4 \cdot 5H_2O$ were dissolved in 100 ml. of water. 49.6 gms. of $Na_2CO_3 \cdot 10H_2O$ were dissolved in 100 mls. of water. The two solutions were mixed and the precipitate filtered and washed with water. The precipitate was slurried with 30 ml. of water and 124 gms. of powdered $CrO_3$ was slowly added with stirring.

The solution was made up to 205 mls. with water and slowly poured onto 200 gms. of zinc oxide which had previously been powdered to pass 18 mesh BSS.

The catalyst was dried at 110° C. for 2 hours and then pelleted with Sterotex to ⅛ inch pellets. The pellets were crushed to 12–18 mesh BSS and heated in air for 4 hours at 1,000 v./v./hr. at 250° C. (in order to remove at least the major part of the Sterotex).

The catalyst had the approximate atomic ratio:

Zn _____ 2
Cr _____ 1
Cu _____ 0.14

Life tests of 50 hours duration were carried out on 40 mls. of the zinc-chromium-copper catalyst; the results are compared below with a run using the same volume of zinc-chromium-copper catalyst, but with 20 mls. of nickel formate-sepiolite catalyst as a guard catalyst and with a run in which the feedstock methanol had been pretreated with caustic soda. Operating conditions were: Atmospheric pressure, water: methanol mol ratio 2:1, methanol liquid space velocity being 1 v./v./hr. or 0.5 v./v./hr. with respect to the zinc-chromium-copper catalyst. The block temperature was adjusted when necessary to maintain a 90 percent methanol conversion level.

TABLE 1

| | Guard Catalyst | | | |
|---|---|---|---|---|
| | None | None | None | 20 ml. nickel formate-sepiolite |
| Catalyst | 40 mls. zinc-chromium-copper catalyst | | | |
| Methanol liquid space velocity (based on Zn-Cr-Cu catalyst) | 1.0 | 0.5 | [1] 1.0 | 1.0 |
| Temperature required for 90% Methanol Conversion: | | | | |
| At 6 hours, ° C | 290 | 275 | 270 | 260 |
| At 25 hours, ° C | 327 | 300 | 290 | 265 |
| At 50 hours, ° C | 350 | 315 | 305 | 270 |
| At 180 hours, ° C | | | | 285 |
| Temperature increase 6-50 hours, ° C | 60 | 40 | 35 | 10 |
| Carbon monoxide content of product gas, percent vol | 1.7 | 0.9 | 0.4 | 5.7 |

[1] Methanol redistilled over caustic soda (9 g. NaOH/500 ml. methanol).

The overall liquid space velocity using the guard catalyst was:

$$\frac{40 \text{ mls. methanol/hr.}}{60 \text{ mls. catalyst}} = 0.67 \text{ vol./vol./hour}$$

The results show that a very much smaller temperature increase was needed to maintain a 90% methanol conversion level when using the guard catalyst, i.e. there was a great improvement in catalyst life.

Using the nickel guard catalyst, the carbon monoxide level in the product gas was much higher than using only the zinc-chromium-copper catalyst.

EXAMPLE 2

The nickel catalyst and the zinc-chromium-copper catalyst described with reference to Example 1 was employed at varying temperatures at atmospheric pressure, a water methanol mol ratio of 2:1 and a methanol space velocity of 1 v./v./hr. with respect to the zinc-chromium-copper catalyst. The results set out in the following Table 2 were obtained.

TABLE 2

| Block Temperature, °C. | Catalyst Temperature, °C. | Percent Methanol Conversion | Product Gas Analysis, percent vol. (Water and Methanol Free) | | | | Percent shift Reaction[1] |
|---|---|---|---|---|---|---|---|
| | | | $H_2$ | CO | $CO_2$ | $CH_4$ | |
| 240 | 230 | 58 | 73.3 | 6.7 | 19.7 | 0.3 | 75 |
| 250 | 241 | 75 | 72.3 | 6.9 | 20.5 | 0.3 | 75 |
| 260 | 250 | 86 | 73.4 | 6.6 | 19.8 | 0.2 | 75 |
| 270 | 256 | 95 | 72.7 | 6.0 | 20.9 | 0.4 | 78 |
| 280 | 265 | 100 | 73.3 | 5.3 | 21.0 | 0.4 | 80 |
| 290 | 315 | 100 | 41.7 | <0.1 | 24.0 | 34.3 | |

[1] Percent shift reaction is defined as
$$\frac{CO_2 \text{ (Percent vol.)}}{CO + CO_2 \text{ (Percent vol.)}} \times 100$$

EXAMPLE 3

The experiment described with reference to Example 2 was repeated with the modification that the methanol space velocity was lowered to 0.5. The results set out in the following Table 3 were obtained.

TABLE 3

| Block Temperature, °C. | Catalyst Temperature, °C. | Percent Methanol Conversion | Product Gas Analysis, percent vol. (Water and Methanol Free) | | | | Percent shift Reaction[1] |
|---|---|---|---|---|---|---|---|
| | | | $H_2$ | CO | $CO_2$ | $CH_4$ | |
| 240 | 236 | 84 | 73.7 | 4.7 | 21.2 | 0.4 | 82 |
| 250 | 247 | 100 | 73.9 | 4.4 | 21.2 | 0.5 | 83 |
| 260 | 255 | 100 | 73.9 | 3.5 | 21.9 | 0.7 | 86 |
| 270 | 267 | 100 | 73.7 | 2.5 | 22.4 | 1.4 | 90 |
| 280 | 299 | 100 | 40.7 | <0.1 | 10.0 | 41.3 | |

[1] Percent shift reaction is defined as
$$\frac{CO_2 \text{ (Percent vol.)}}{CO + CO_2 \text{ (Percent vol.)}} \times 100$$

EXAMPLE 4

A life test was performed using the zinc-chromium-copper catalyst described in Example 1 firstly with and then without the nickel formate on sepiolite guard catalyst also described in Example 1. The original feed was commercial methanol containing up to 0.05% by weight of impurity. Later in the run commercial methanol contaminated by the addition of ethanol, its major impurity, was used. The results are set out in Table 4.

TABLE 4

| | Guard Catalyst | |
|---|---|---|
| | None | 20 ml. nickel formate on sepiolite |
| Catalyst | 40 ml. zinc-chromium-copper | |
| Block temperature, °C | 240 | 240 |
| Pressure | Atmospheric | Atmospheric |
| Methanol Space Velocity (with respect to the Zn-Cr-Cu catalyst) | 1 | 1 |
| Methanol Conversion, percent wt.: | | |
| After 4 hrs. on stream with commercial methanol | 57 | 84 |
| After a further 4 hours with commercial methanol plus 0.2 percent wt. ethanol | 49 | 81 |
| After a further 2 hours with commercial methanol plus 1.0 percent wt. ethanol | 11 | 81 |

The run showing no guard catalyst is provided for comparison only.

These results show unequivocally that even with commercial methanol the activity of the prior art catalyst, without the guard catalyst falls off much more quickly than that of the catalyst of the present invention. When extra ethanol is added the effect is even more pronounced.

We claim:
1. A process for the production of a hydrogen-containing gas which comprises passing a mixture of methanol and water, at a temperature in the range of 150°–350° C. and in vapour phase, over a supported nickel catalyst, for the decomposition of at least part of the impurities contained in the methanol and whereby some of the methanol is also decomposed and thereafter passing the product at a temperature of 240°–270° C. over a catalyst comprising zinc oxide and copper oxide, whereby a substantial part of the remaining methanol is decomposed with production of a hydrogen-containing gas.

2. A process according to claim 1 wherein the catalyst comprising zinc oxide and copper oxide also contains chromium oxide.

3. A process according to claim 1 wherein the nickel catalyst and the zinc/copper containing catalyst are located in separate reactors.

4. A process according to claim 1 wherein the methanol is washed with alkali before being passed over the nickel containing catalyst.

5. A process according to claim 3 wherein the temperature in the second stage lies in the range 150°–400° C.

6. A process according to claim 1 wherein the liquid space velocity of methanol passing over the zinc/copper containing catalyst lies in the range 0.5–1.0 vol./vol./hr.

7. A process according to claim 6 wherein the mol. ratio of water to methanol lies in the range 1:1 to 4:1.

8. A process according to claim 7 wherein the mol. ratio of water to methanol is 2:1.

9. A process according to claim 1 wherein the atomic ratio of zinc to copper is the catalyst comprising zinc oxide and copper oxide lies in the range 100:1 to 2:1.

10. A process according to claim 2 wherein the atomic ratio of zinc to chromium in the catalyst comprising zinc oxide and copper oxide and chromium oxide lies in the range 4:1 to 1:1.

11. A process according to claim 1 wherein the flow of feedstock is periodically discontinued and the catalyst system is periodically regenerated by passing a free oxygen-containing gas at a temperature in the range of 150°–450° C. through the reactor.

12. A process according to claim 11 wherein the free oxygen-containing gas is air.

13. A process according to claim 11 wherein a free hydrogen-containing gas is passed at elevated temperature over the catalyst system in order to reactivate the nickel catalyst before restoring the flow of feedstock.

References Cited

UNITED STATES PATENTS

| 1,915,362 | 6/1933 | Hanks et al. | 23—212 |
| 2,010,427 | 8/1938 | Eversole. | |
| 2,425,625 | 8/1947 | Larson | 23—212 |
| 3,179,500 | 4/1965 | Bowen et al. | 23—212 XR |
| 3,197,284 | 7/1965 | Hoekstra | 23—212 |
| 3,338,681 | 8/1967 | Kordesch | 23—212 XR |

EDWARD STERN, Primary Examiner

U.S. Cl. X.R.

252—373

PO-1050
(5/69)

UNITED STATES PATENT OFFICE
CERTIFICATE OF CORRECTION

Patent No. 3,515,514                 Dated    6/2/70

Inventor(s) Peter Desmond Holmes, Alan Richard Thornhill

It is certified that error appears in the above-identified patent and that said Letters Patent are hereby corrected as shown below:

Column 3, line 73 change "100" to - - 1000 - -

SIGNED AND
SEALED
SEP 15 1970

(SEAL)
Attest:

Edward M. Fletcher, Jr.
Attesting Officer

WILLIAM E. SCHUYLER, JR.
Commissioner of Patents